United States Patent [19]
Singhal

[11] Patent Number: 5,236,150
[45] Date of Patent: Aug. 17, 1993

[54] MODEL/EXPERIMENTAL PLANE CRASH HARNESS

[76] Inventor: Tara C. Singhal, P.O. Box 5075, Torrance, Calif. 90510

[21] Appl. No.: 798,529

[22] Filed: Nov. 27, 1991

[51] Int. Cl.$^5$ ............................................. B64C 25/00
[52] U.S. Cl. ........................... 244/100 R; 244/110 R; 267/46; 293/130; 446/429; 446/34
[58] Field of Search ................ 244/108, 109, 100 R, 244/110 R; 267/42, 45, 46, 47, 261; 293/124, 130; 446/55, 429, 34

[56] References Cited

U.S. PATENT DOCUMENTS

| | | | |
|---|---|---|---|
| 1,073,804 | 9/1913 | Haston | 267/46 |
| 1,111,278 | 9/1914 | Van Syckel | 267/46 |
| 1,630,893 | 5/1927 | Doty | 293/130 X |
| 2,492,965 | 1/1950 | Carr | 244/108 |
| 4,830,343 | 5/1989 | Johnson et al. | 267/46 X |

FOREIGN PATENT DOCUMENTS

| | | | |
|---|---|---|---|
| 0557121 | 4/1923 | France | 244/109 |
| 0428053 | 5/1935 | United Kingdom | 446/55 |

*Primary Examiner*—Joseph F. Peters, Jr.
*Assistant Examiner*—Christopher P. Ellis

[57] ABSTRACT

A way to make model/experimental planes crash proof by a shock absorbing harness mounted over the body of the plane, which does not significantly affect the flying abilities and qualities of the model/experimental.

The harness protects against collision with ground or other objects by strategically placing shock absorbing structures on the body of the aircraft. These structures are protruding from the overall outer dimension of the model/experimental aircraft and are the ones to first hit external objects and the ground. These shock absorbing structures are made of material that is light and provides the resiliency and cushion against the impact to the model/experimental body. The design is such that they add very little weight and drag to the model/experimental aircraft. The structures are made of thin wires and resemble an inverted question mark in its basic configuration. The basic structures are combined to produce a structure which can absorb crash impact forces from different angles of crash and are mounted on the body of the model/experimental aircraft to protect it from all foreseeable angles of crash.

13 Claims, 2 Drawing Sheets

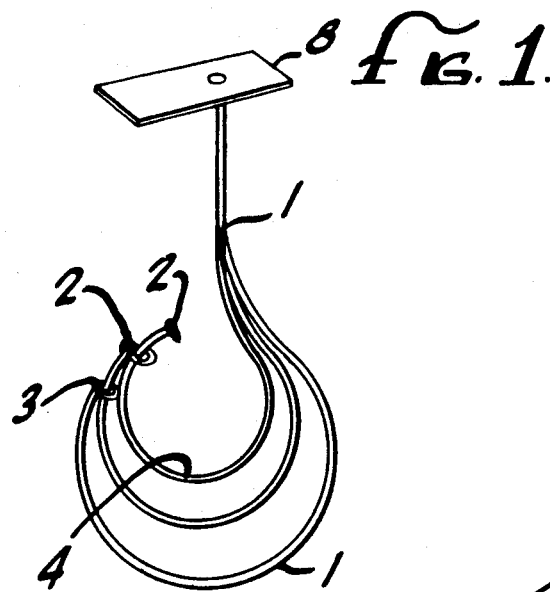
FIG. 1.
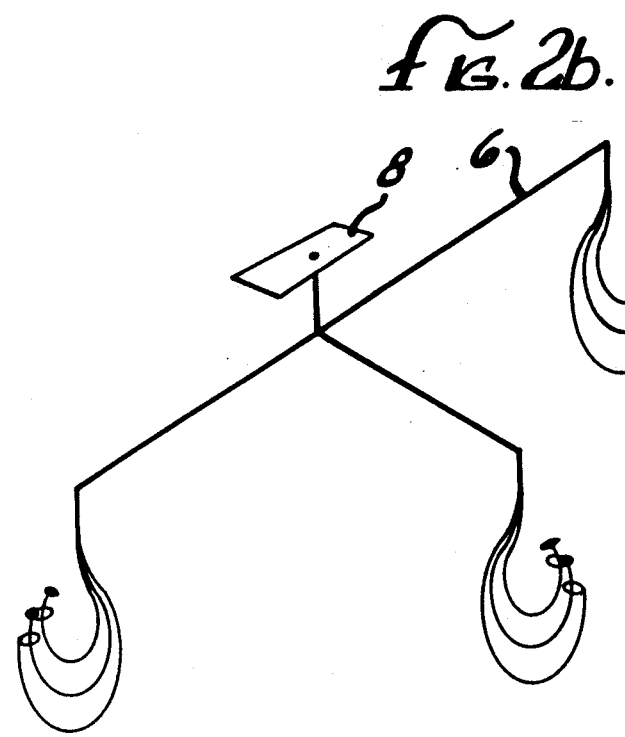
FIG. 2b.
FIG. 2a.
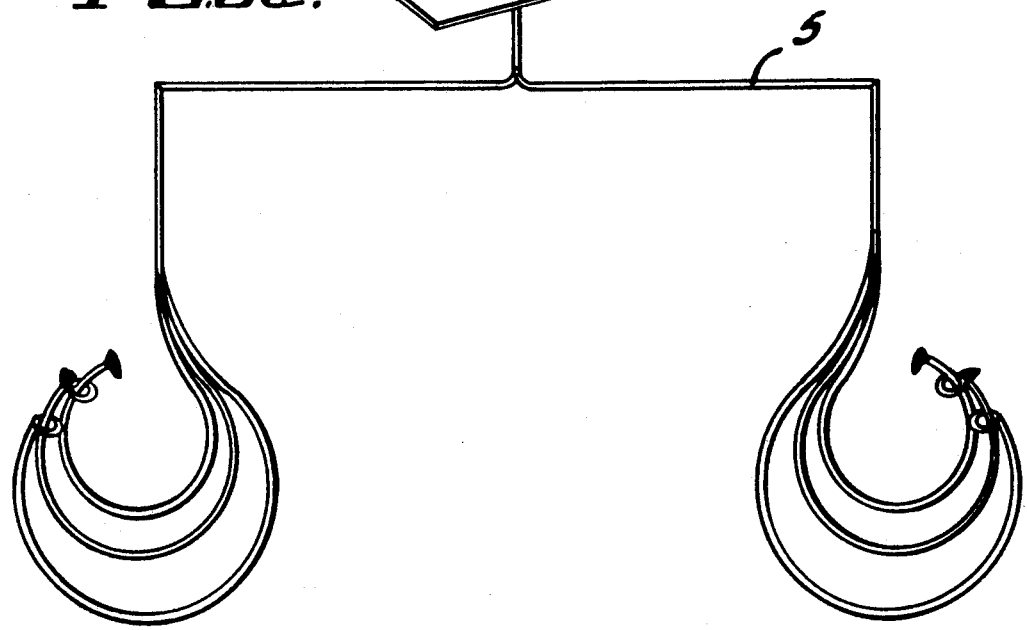

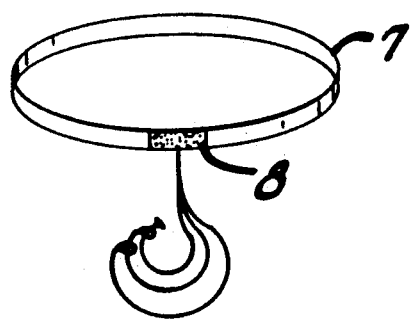
FIG.3a.
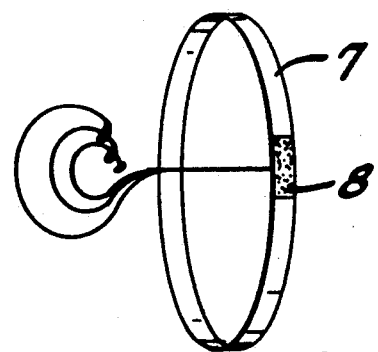
FIG.3b.
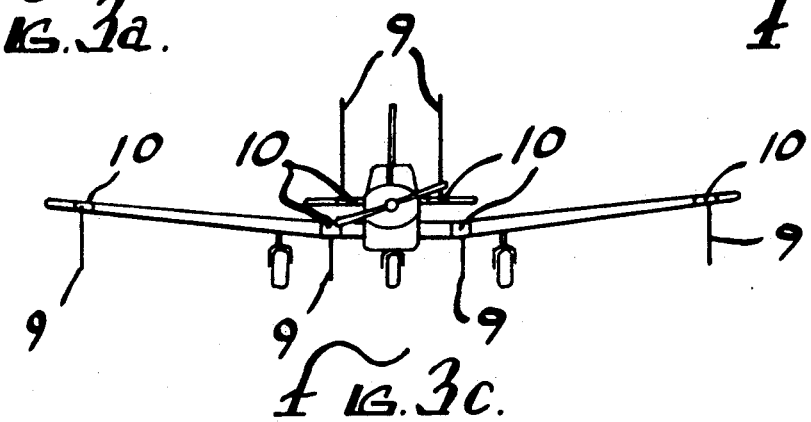
FIG.3c.
FIG.3d.
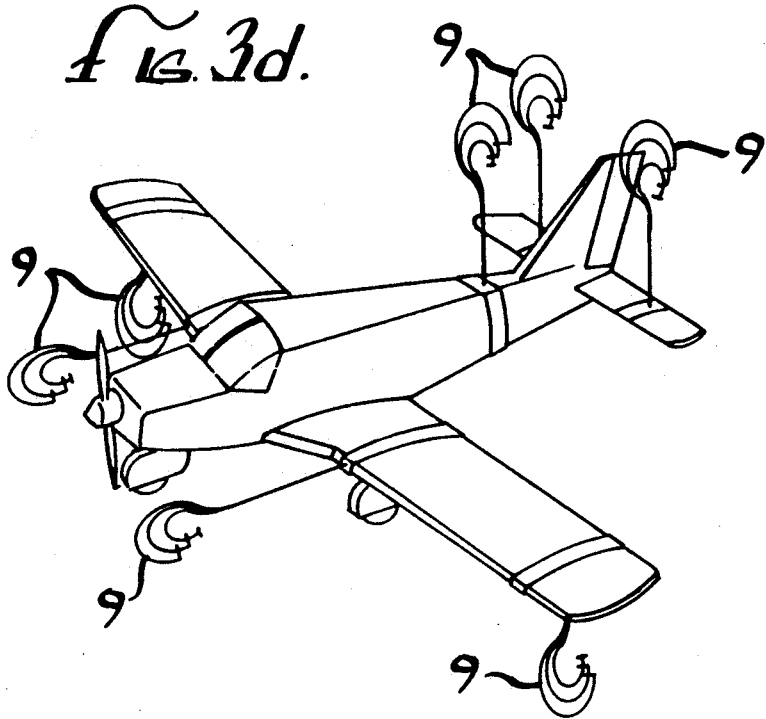

MODEL/EXPERIMENTAL PLANE CRASH HARNESS

BACKGROUND OF THE INVENTION

1. Field of Invention

Model/experimental plane can be saved from damage and destruction because of crashes, if a shock absorbing harness can be developed, which can be mounted over the body of the plane, and which does not significantly affect the flying abilities and qualities of the model/experimental aircraft, then such a harness is very useful. This specification concerns such a harness. This specification grew out of my son's keen interest in flying radio controlled model planes but unable to do so because of fear of crashing planes and thereby losing few hundred dollars worth of money as well as waste of a lot of time.

SUMMARY OF THE INVENTION

The model/experimental aircraft can be made crash proof, against collision with ground or other objects by strategically placing shock absorbing structures on the body of the aircraft. These structures are protruding from the overall outer dimension of the model/experimental aircraft and are the ones to first hit external objects and the ground.

These shock absorbing structures are made of material that is light and provides the resiliency and cushion against the impact to the model/experimental plane's body. The design is such that they add very little weight and drag to the model/experimental aircraft. The structures are made of thin wires and resemble an inverted question mark in its basic configuration.

The basic structures are combined to produce a structure which enhances shock absorbing ability and can absorb crash impact forces from more than one angle of crash and are mounted on the body of the model/experimental aircraft to protect it from all foreseeable angles of crash. These structure if the requirements warrant it for larger than model planes, and like a landing gear, can be folded into the body of the plane by a retracting means (10) and be deployed when needed before a crash occurs or if the possibility of the existence of the crash exists.

BRIEF DESCRIPTION OF THE DRAWINGS

FIGS. 2a and 2b. Some combinations of basic shock absorbing structure.

FIGS. 3a, 3b, 3c and 3d. Shock absorbing structure mounting means and one possible arrangement for mounting these structures on the body of model/experimental aircraft.

DESCRIPTION OF THE PREFERRED EMBODIMENT

The model/experimental aircraft, can be made crash proof, against collision with ground or other objects by strategically placing shock absorbing structures on the body of the aircraft. These structures are protruding from the overall outer dimension of the model/experimental aircraft and are the ones to first hit external objects and the ground.

These shock absorbing structures are made of material that is light and provides the resiliency and cushion against the impact to the model/experimental plane's body. The design is such that they add very little weight and drag to the model/experimental aircraft. The structures are made of wires and resemble an inverted question mark in its basic configuration.

The basic structures are combined to produce a structure which enhances shock absorbing ability and can absorb crash impact forces from more than one angle of crash and are mounted on the body of the model/experimental aircraft to protect it from all foreseeable angles of crash. These structures, if the requirements warrant it for larger than model planes, and like a landing gear, can be folded into the body of the plane, with a retracting mechanism (10), and be deployed when needed before a crash occurs or if the possibility of the existence of the crash exists.

Refer to FIG. 1. A form of such shock absorbing structure is an inverted question mark shape made of thin and resilient spring like wire, such that when the curved portion of the structure is pushed against a hard object or surface, it bends and absorbs shock like a spring and then returns back to its normal position.

The curved portion is in fact doubled or tripled up with smaller size similar curved portions inside the outer curved portion but connected to the same vertical leg of the question mark shape (1). These smaller inner curved portions also assist in absorbing some of the shock that exceeds the shock absorbed by the outer curved portion as explained below.

One end of the tip of the curved portion of the inner loop is connected to the vertical part of the question mark, the other end of the inner curved portions extends and ends in a plate or knob type part (2). Of the outer curved portion, the one end not connected to vertical part of question mark, has a ring attached which rides over/around a part of the inner curved portion (3). When the structure receives crash shock, first the outer curved portion absorbs shock and bends. At a certain point, the inner curved portion is activated when the ring pushes the plate up and the inner portion is then assisting in absorbing shock and so on if there is a third inner curved portion (4). Therefore the crash shock is first borne by the outer curved portion, after the shock exceeds a certain value, the inner curved portion is used in absorbing shock and so on for the one more inner curved portion.

Refer to FIG. 2. The basic shock absorbing structure described above will be combined with more of the same structures to enhance shock absorbing ability from more than one crash angle direction. Some combination examples are side by side structure (5), pattern of three structure (6). Other combinations made of basic structure are possible depending on a particular need in a specific design of a crash harness without deviating from the basic concept.

Refer to FIG. 3. These structures will be attached to model/experimental aircraft body at different places with the help of some kind of harness made of wire or straps made from plastic strips and velcro which can be easily put on and removed and which do not add significant drag and weight (7). The vertical leg of the question mark shaped basic structure ends in a plate, which plate is attached to the vertical leg of the question mark at any suitable angle by either welding or screwing in, which plate is used in assisting in anchoring the structure to the body of the plane (8). The plate can be and is easy to embed in the harness made of wire or strap. The most probable locations to mount such shock absorbing structures are in front of the prop/engine extending out from the body, under the tip of the wings and on top rear of the plane to protect the vertical stabilizer if the plane carts over, to act as crash proof harness (9). The structures can be retracted into the fuselage by retracting means (10).

Naturally the shock absorbing ability of the basic structure is a function of type, length and thickness of the wire used and size of the structure itself. The kind of a crash harness that should be utilized will be calculated from the weight of model/experimental aircraft and its crashing velocity, and the possible crashing angles and the shock received at different parts of the model/experimental aircraft. It is assumed that most model aircraft are nearly in the two pound weight range. Therefore a harness suitable for this weight is of interest here, however the application of this harness to other weight model or experimental aircraft or other non aircraft applications is not ruled out.

Therefore I claim:

1. A shock-absorber suitable for mounting on an airplane to prevent damage to said airplane during landing or in the event of a crash, the shock-absorber comprising:
   (a) an outer resilient structure and a plurality of successive inner resilient structures having opposed first and second ends, the resilient structures being fixedly connected together at their first ends and movably connected together at their second ends, each resilient structure having a curved portion at a pre-crash normal position;
   wherein each curved portion is sufficiently resilient that when the curved portion is pushed against a hard surface, it bends and absorbs shock and then returns back to its pre-crash normal position after the shock is removed;
   wherein the force of the crash is initially absorbed by the outer resilient structure;
   (b) means for attaching the resilient structures to the airplane with the curved portions extending away from the airplane; and
   (c) means for interconnecting the curved portions of the resilient structures so that each successive inner resilient structure bends in succession in response to increased force being imparted on the outer resilient structure.

2. The shock-absorber of claim 1 wherein when the shock-absorber is mounted on the airplane, the resilient structures have the form of an inverted question mark.

3. The shock-absorber of claim 1 wherein the resilient structures are formed of thin and resilient wire.

4. The shock-absorber of claim 1 wherein the resilient structures are substantially parallel to each other.

5. The shock-absorber of claim 1 wherein the means for attaching the resilient structure to the airplane is a flexible strap which attaches to the resilient structure and wraps around the airplane.

6. An airplane having mounted thereon a plurality of the shock-absorbers defined in claim 1.

7. The airplane of claim 6 including means to retract the shock-absorbers.

8. A shock-absorber suitable for mounting on an airplane to prevent damage to the airplane during landing or in the event of a crash, the shock-absorber comprising:
   (a) at least first and second resilient structures, which are substantially parallel to each other, the resilient structures having a pre-crash shape and opposed first and second ends, the resilient structures being fixedly connected together at their first ends and movably connected together at their second ends, each resilient structure having a curved portion in its pre-crash shape;
   wherein each curved portion is sufficiently resilient that when the curved portion is pushed against a hard surface, it bends and absorbs shock and then returns back to its pre-crash shape after the shock is removed;
   wherein the second end of the first resilient structure comprises sliding ring means adapted to ride over and slidingly connect to the curved portion of the second resilient structure, and the second end of the second resilient structure comprises activation means so that the sliding ring means can activate the second resilient structure to absorb shock;
   wherein the shock is initially absorbed by the first resilient structure;
   wherein when a sufficient force is applied to the first resilient structure, the sliding ring means contacts the activation means and the second resilient structure bends to absorb shock; and
   (b) means for attaching the resilient structures to an airplane with the curved portion extending away from the airplane.

9. An airplane having mounted thereon a plurality of the shock-absorbers defined in claim 2.

10. A shock-absorber for mounting on an airplane to prevent damage to the airplane during landing or in the event of a crash, the shock-absorber comprising:
    (a) an outer resilient structure, an inner resilient structure, and at least one middle resilient structure between the inner and outer resilient structures, the resilient structures being substantially parallel to each other, each resilient structure having a pre-crash shape and opposed first and second ends, the resilient structures being fixedly connected together at their first ends and movably connected at their second end, each resilient structure having a curved portion in its pre-crash shape;
    wherein each curved portion is sufficiently resilient that when the curved portion of the outer structure is pushed against a hard surface, it bends and absorbs shock and then returns back to its pre-crash shape when the shock is removed;
    wherein the second ned of the outer structure and the second end of the middle structure comprise sliding ring means adapted to ride over and slidingly connect to the curved portion of the successively inward resilient structure, each successively inward resilient structure comprising activation means so that the sliding ring means can activate each successively inward structure s the shock increases;
    wherein the shock is initially absorbed by the outer resilient structure;
    wherein when a sufficient force is applied to the outer resilient structure, the sliding ring means of the outer resilient structure contacts the activation means of the successive inner structure and the successive inner structure bends to absorb shock;
    wherein each successively inward structure is activated by the sliding ring means of the successively outward structure as the shock increases; and
    (b) means for attaching the resilient structures to the airplane with the curved portion extending away from the airplane.

11. An airplane having mounted thereon the shock-absorber of claim 10.

12. The airplane of claim 10 including means to retract the shock-absorber.

13. An airplane having mounted therefrom a plurality of shock-absorbers to prevent damage to the airplane during landing or in the event of a crash, each shock-absorber comprising:
- (a) an outer resilient structure, an inner resilient structure, and at least one middle resilient structure between the inner and outer resilient structures, the resilient structures being substantially parallel to each other, each resilient structure having a pre-crash shape and opposed first and second ends, the resilient structures being fixedly connected together at their first ends and movably connected at their second ends, each resilient structure having a curved portion at its pre-crash shape;

wherein each curved portion is sufficiently resilient that when the outer curved portion is pushed against a hard surface, it bends and absorbs shock and then returns back to its pre-crash shape after the shock is removed;

wherein the second end of the outer structure and the second end of the middle structure comprise sliding ring means adapted to ride over and slidingly connect to the curved portion of the successively inward resilient structure, each successively inward resilient structure comprising activation means so that the sliding ring means can activate each successively inward structure as the shock increases;

wherein the shock is initially absorbed by the outer resilient structure;

wherein when a sufficient force is applied to the outer resilient structure, the sliding ring means of the outer resilient structure contacts the activation means of the successive inner structure and the successive inner structure bends to absorb shock;

wherein each successively inward structure is activated by the siding ring means of the successively outward structure as the shock increases;

wherein the resilient structures are formed of a thin and resilient wire; and

- (b) means for attaching the resilient structures to the airplane with the curved portions extending away form the airplane.

* * * * *